United States Patent
Israelsson

(10) Patent No.: US 9,188,981 B2
(45) Date of Patent: Nov. 17, 2015

(54) VEHICLE SYSTEM, A VEHICLE AND A METHOD FOR AUTONOMOUS ROAD IRREGULARITY AVOIDANCE

(71) Applicant: VOLVO CAR CORPORATION, Gothenburg (SE)

(72) Inventor: Erik Israelsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/296,724

(22) Filed: Jun. 5, 2014

(65) Prior Publication Data

US 2015/0012165 A1    Jan. 8, 2015

(30) Foreign Application Priority Data

Jul. 3, 2013    (EP) .................................... 13174855

(51) Int. Cl.
| | |
|---|---|
| G01C 23/00 | (2006.01) |
| G05D 1/02 | (2006.01) |
| B62D 15/02 | (2006.01) |
| B60W 30/08 | (2012.01) |
| G01C 21/30 | (2006.01) |

(52) U.S. Cl.
CPC ............... *G05D 1/021* (2013.01); *B60W 30/08* (2013.01); *B62D 15/0265* (2013.01); *G01C 21/30* (2013.01); *G05D 1/0255* (2013.01); *G05D 1/0257* (2013.01); *G05D 1/0259* (2013.01); *G05D 1/0276* (2013.01); *G05D 1/0278* (2013.01); *B60W 2550/147* (2013.01); *B60W 2550/40* (2013.01); *B60W 2550/402* (2013.01); *B60W 2550/406* (2013.01)

(58) Field of Classification Search
CPC ................ B60K 31/0008; G08G 1/20; B60W 2550/308; B60W 2550/402; G01S 17/42; G01S 17/936; G01S 19/11; G01S 11/27

USPC .............. 701/23, 36, 467, 300, 301; 340/435, 340/961, 988
See application file for complete search history.

(56) References Cited

U.S. PATENT DOCUMENTS

| | | |
|---|---|---|
| 6,484,089 B1 | 11/2002 | Millington |
| 2009/0164063 A1 | 6/2009 | Piccinini et al. |
| 2010/0121577 A1 | 5/2010 | Zhang et al. |
| 2012/0035788 A1* | 2/2012 | Trepagnier et al. ............... 701/3 |
| 2012/0323474 A1* | 12/2012 | Breed et al. .................... 701/117 |

FOREIGN PATENT DOCUMENTS

DE    102012018122    3/2013

OTHER PUBLICATIONS

Extended European Search Report for EP 13174855.0, Completed by the European Patent Office, Dated May 12, 2013, 4 Pages.

* cited by examiner

*Primary Examiner* — Gertrude Arthur Jeanglaude
(74) *Attorney, Agent, or Firm* — Brooks Kushman, P.C.

(57) ABSTRACT

A vehicle, a vehicle system and a method for allowing a host vehicle to autonomously avoid road irregularities are provided. The system communicates vehicle sensor data relating to detected road irregularities and host vehicle position information with an external database. A processor is arranged to determine a trajectory for the host vehicle for which all wheels of the host vehicle are laterally displaced from one or more road irregularities ahead of the host vehicle, and to autonomously steer the host vehicle along the determined trajectory. The system is also arranged to evaluate whether all wheels of the host vehicle were laterally displaced from all detected road irregularities and to send the result of the evaluation to the external database.

20 Claims, 3 Drawing Sheets

VEHICLE SYSTEM, A VEHICLE AND A METHOD FOR AUTONOMOUS ROAD IRREGULARITY AVOIDANCE

CROSS-REFERENCE TO RELATED APPLICATIONS

This application claims foreign priority benefits under 35 U.S.C. §119(a)-(d) to European patent application number EP 13174855.0, filed Jul. 3, 2013, which is incorporated by reference in its entirety.

TECHNICAL FIELD

Embodiments herein relate to a vehicle system for autonomous road irregularity avoidance. Embodiments herein further relate to a vehicle comprising a vehicle system for autonomous road irregularity avoidance, and to a method for allowing a host vehicle to autonomously avoid road irregularities.

BACKGROUND

Driving comfort depends on a multitude of factors, such as vehicle suspension, tire properties, road conditions etc. A relevant factor is whether the vehicle is driven along a smooth road surface or into potholes and across bumps. With potholes is here understood disruptions in the road surface where a portion of the road material has broken away, leaving a hole. With bumps is here understood disruptions in the road surface where a portion of the road is raised, forming an upwardly extending protrusion. If contact with bumps and potholes can be avoided, a perceived driving comfort may be increased.

It is known to control steering of a vehicle based on input from sensors detecting a vehicle surrounding. In U.S.2012035788A1 is described a navigation and control system for autonomous vehicles. The system includes a sensor for locating objects in a predetermined field of view from a vehicle. A processor can correlate GPS-position, LIDAR-measurements and deflection angle data to produce a map of obstacles in a path of the vehicle. The map is used such that the detected obstacles can be mapped relative to the path of the vehicle, and steering and speed control directions are provided to the vehicle in order to avoid the obstacle. The system can take into consideration the destination of the vehicle, and thereby provide steering and speed control directions to the vehicle in order to avoid the obstacle and to return on course to the destination.

U.S.2010121577A1 relates to autonomous driving of vehicles. In U.S.2010121577A1 is described a method for detecting a clear path of travel for a vehicle and for generating a data stream corresponding to a three-dimensional scan of a target area surrounding the vehicle from a vehicle LIDAR system. The vehicle can identify road conditions via a camera, a radar imaging system, GPS-information, or from other vehicles in communication with the vehicle.

U.S.2012323474A1 relates to a system and a method for conveying data between vehicles. The system includes means to obtain or generate information about conditions around a first vehicle, which information can be sent to other vehicles via a communication system or internet. A position and a movement of the first vehicle and a second vehicle are determined and transmitted via internet to the second vehicle. The positions and movements of the first and second vehicles are analyzed at the second vehicle, and the second vehicle is directed to take action based on analysis of the relative positions and movements of the first and second vehicles. An intended travel path of the second vehicle may be altered for collision avoidance purposes and the information obtained or generated at the first vehicle may be stored in a database. A maintenance state of the roadway can be automatically monitored and relevant information can be transmitted automatically over internet, to a central control station, along with appropriate pictures if available.

In U.S. Pat. No. 6,484,089B1, a vehicle navigation system is presented. The system includes a map database and at least one inertial sensor. When a vehicle encounters a problem road condition, such as a pothole, the problem road condition induces acceleration in the inertial sensor. The navigation system identifies the occurrence of a problem road condition by monitoring the signals generated by the inertial sensor. The navigation system then stores the occurrence and location of the problem road condition. This data can be used later to identify, locate and repair problem road conditions.

The systems referred to may increase perceived vehicle operator comfort in some situations, but improvements in the field of autonomous road irregularity avoidance are still desirable.

SUMMARY

Embodiments herein aim to provide a vehicle system for autonomous road irregularity avoidance eliminating or at least reducing the problems and/or drawbacks described above.

According to a first aspect, this is achieved by a vehicle system for autonomous road irregularity avoidance comprising: vehicle sensors, arranged to detect irregularities on a road travelled by a host vehicle; position determination means, arranged to continuously determine the host vehicle position; communication means, arranged to send vehicle sensor data relating to detected road irregularities and host vehicle position information to an external database for compiling road irregularity position information; processing means, comprising steering control logic; a vehicle steering system arranged to affect at least one host vehicle wheel, for enabling steering of the host vehicle wherein the communication means are arranged to receive, from the external database, information relating to road irregularity positions on the road ahead of the host vehicle, the processing means further being arranged to determine a trajectory for the host vehicle for which all wheels of the host vehicle are laterally displaced from one or more road irregularities ahead of the host vehicle, and the vehicle steering system further being arranged to autonomously steer the host vehicle along the determined trajectory and in that the processing means further are arranged to evaluate whether all wheels of the host vehicle were laterally displaced from all detected road irregularities for a predefined road section of a used trajectory, and that the communication means are arranged to send the result of the evaluation to the external database.

Since the system is arranged to receive information relating to road irregularity positions, to determine a trajectory for which all wheels are laterally displaced from one or more road irregularities, to steer the host vehicle, to evaluate whether all wheels of the host vehicle were laterally displaced from all detected road irregularities and to send the result to the external database, vehicle operator comfort may be increased.

Thanks to the vehicle system for autonomous road irregularity avoidance, driving comfort during autonomous or semi-autonomous driving can be increased. "Semi-autonomous" refers to driving with both manual and autonomous input. During manual driving, a driver that drives the same road frequently may soon learn a unique profile of the road. An example of such a road may be a road between the driver's home and the driver's workplace. An active driver may learn the exact position of road irregularities, such as bumps and potholes, along the road, and may make an effort to avoid them when possible. Often just a small lateral adjustment of the vehicle is enough for the avoidance. The vehicle system according to embodiments herein can achieve a comfort level similar to the comfort level achieved when an active driver drives the vehicle along a road that he/she knows well.

The avoidance of driving into road irregularities is beneficial, not only for the driving comfort, but also for reducing wear on e.g. a vehicle chassis and a vehicle suspension system. It may also slow down further degradation on the road, since a pothole is quickly worsened with the number of vehicles that are running their wheels over the pothole.

However, when an experienced driver only may learn one or a few roads, the vehicle system according to enclosed embodiments may use compiled data relating to road irregularities for many roads.

Several vehicles equipped with the system may send vehicle sensor data relating to detected road irregularities and host vehicle position information to an external database such that a lot of road irregularity position information for road networks may be compiled. Hereby the collectively gathered data may be used in each and every one of the vehicles in order to avoid road irregularities. In autonomous or semi-autonomous vehicles, the system may be very beneficial, since a driver may not be prepared to repeatedly intervene in a situation where the vehicle approaches a pothole.

Thus, hereby is provided a vehicle system for autonomous road irregularity avoidance eliminating or at least reducing the problems and/or drawbacks described above.

According to some embodiments, the position determination means are arranged to determine the host vehicle position using input both from a global positioning system and from a vehicle system for detecting a lateral distance from road markings.

Since input both from a global positioning system and a vehicle system for detecting a lateral distance from road markings are used, a very accurate determination is achieved. A global positioning system may provide good positional information, and a vehicle system for detecting a lateral distance from road markings may provide the system with accurate information of the vehicle's lateral position on the road. When inputs from both systems are used together, the host vehicle position can be determined in a precise and reliable manner.

According to some embodiments, the vehicle system comprises lateral acceleration sensors, arranged to detect lateral acceleration of the host vehicle, and that the processing means are arranged to determine the host vehicle trajectory for which a lateral acceleration of the host vehicle is minimized.

Since the lateral acceleration sensors and the processing means are used to determine a host vehicle trajectory for which a lateral acceleration of the host vehicle is minimized, comfort may be increased. The host vehicle can travel as smooth as possible along a road section while road irregularities are avoided.

According to some embodiments, one or more of the vehicle sensors are arranged to detect a road irregularity when at least one of the host vehicle wheels is in contact with the road irregularity, the sensor being at least one of an inertial sensor, an active chassis sensor, a wheel sensor, an acoustic sensor and a vehicle level sensor.

Since the road irregularity is detected with at least one of an inertial sensor, an active chassis sensor, a wheel sensor, an acoustic sensor and a vehicle level sensor, road irregularities can be detected in a reliable manner when the host vehicle passes the road irregularity.

According to some embodiments, one or more of the vehicle sensors are arranged to detect a road irregularity ahead of the host vehicle, the sensor being at least one of an image capturing sensor, a radar sensor and a lidar sensor.

Since the road irregularity is detected with at least one of an image capturing sensor, a radar sensor and a lidar sensor, road irregularities can be detected in a reliable manner ahead of the host vehicle.

According to some embodiments, one or more of the sensors are arranged to detect at least one of an elevation and an extension of a road irregularity when at least one of the host vehicle wheels is in contact with the road irregularity, the communication means further being arranged to send vehicle sensor data relating to at least one of the elevation and the extension of the road irregularity to the external database.

Since at least one of an elevation and an extension of a road irregularity is detected and sensor data relating to this is sent to the external database, detailed information relating to the road irregularities can be compiled in the database.

According to some embodiments, one or more of the sensors are arranged to detect at least one of an elevation and an extension of a road irregularity ahead of the host vehicle, the communication means further being arranged to send vehicle sensor data relating to at least one of the elevation and the extension of the road irregularity to the external database.

Since at least one of an elevation and an extension of a road irregularity is detected and sensor data relating to this is sent to the external database, detailed information relating to the road irregularities may be compiled in the database.

Thus, hereby is provided a vehicle system for autonomous road irregularity avoidance eliminating or at least reducing the problems and/or drawbacks described above.

Embodiments herein also aim to provide a vehicle without the problems or drawbacks described above.

According to some embodiments, this is achieved by a vehicle comprising a vehicle system for autonomous road irregularity avoidance according to embodiments disclosed herein. Hereby driving comfort can be increased.

Embodiments herein also aim to provide a method for allowing a host vehicle to autonomously avoid road irregularities without the problems or drawbacks described above.

According to some embodiments, this is achieved by a method for allowing a host vehicle to autonomously avoid road irregularities on a road travelled by the host vehicle, wherein the method comprises; detecting, by vehicle sensors, irregularities on a road travelled by the host vehicle; continuously determining the host vehicle position, using position determination means; sending, by communication means, vehicle sensor data relating to detected road irregularities and host vehicle position information to an external database for compiling road irregularity position information; receiving, from the external database, information relating to road irregularity positions on the road ahead of the host vehicle; determining, by processing means, a trajectory for the host vehicle for which all wheels of the host vehicle are laterally displaced from one or more road irregularities ahead of the host vehicle; autonomously steering the host vehicle along the determined trajectory; evaluating, by the processing means, whether all wheels of the host vehicle were laterally displaced from all detected road irregularities for a predefined road section of a used trajectory, and sending, by the communication means, a result of the evaluation to the external database. Hereby vehicle operator comfort can be increased.

According to some embodiments, the method further comprises; determining, by the processing means, the host vehicle trajectory for which a, by the vehicle sensors detected, lateral acceleration of the host vehicle is minimized.

Since the host vehicle trajectory for which a lateral acceleration of the host vehicle is minimized is determined, driving comfort can be increased.

According to some embodiments, the method further comprises; detecting, by the vehicle sensors, at least one of an elevation and an extension of a road irregularity when at least one of the host vehicle wheels is in contact with the road irregularity; and sending, by the communication means, vehicle sensor data relating to at least one of an elevation and an extension of the road irregularity to the external database.

Since at least one of an elevation and an extension of a road irregularity is detected and sensor data relating to this is sent to the external database, detailed information relating to the road irregularities can be compiled in the database.

Thus, hereby is provided method for allowing a host vehicle to autonomously avoid road irregularities eliminating or at least reducing the problems and/or drawbacks described above.

Further features of, and advantages with, the embodiments herein will become apparent when studying the appended claims and the following detailed description. Those skilled in the art will realize that different features of the embodiments herein may be combined to create embodiments other than those described in the following, without departing from the scope of the appended claims.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components.

Therefore, specific structural and functional details disclosed herein are not to be interpreted as limiting, but merely as a representative basis for teaching one skilled in the art to variously employ the present disclosure.

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1:
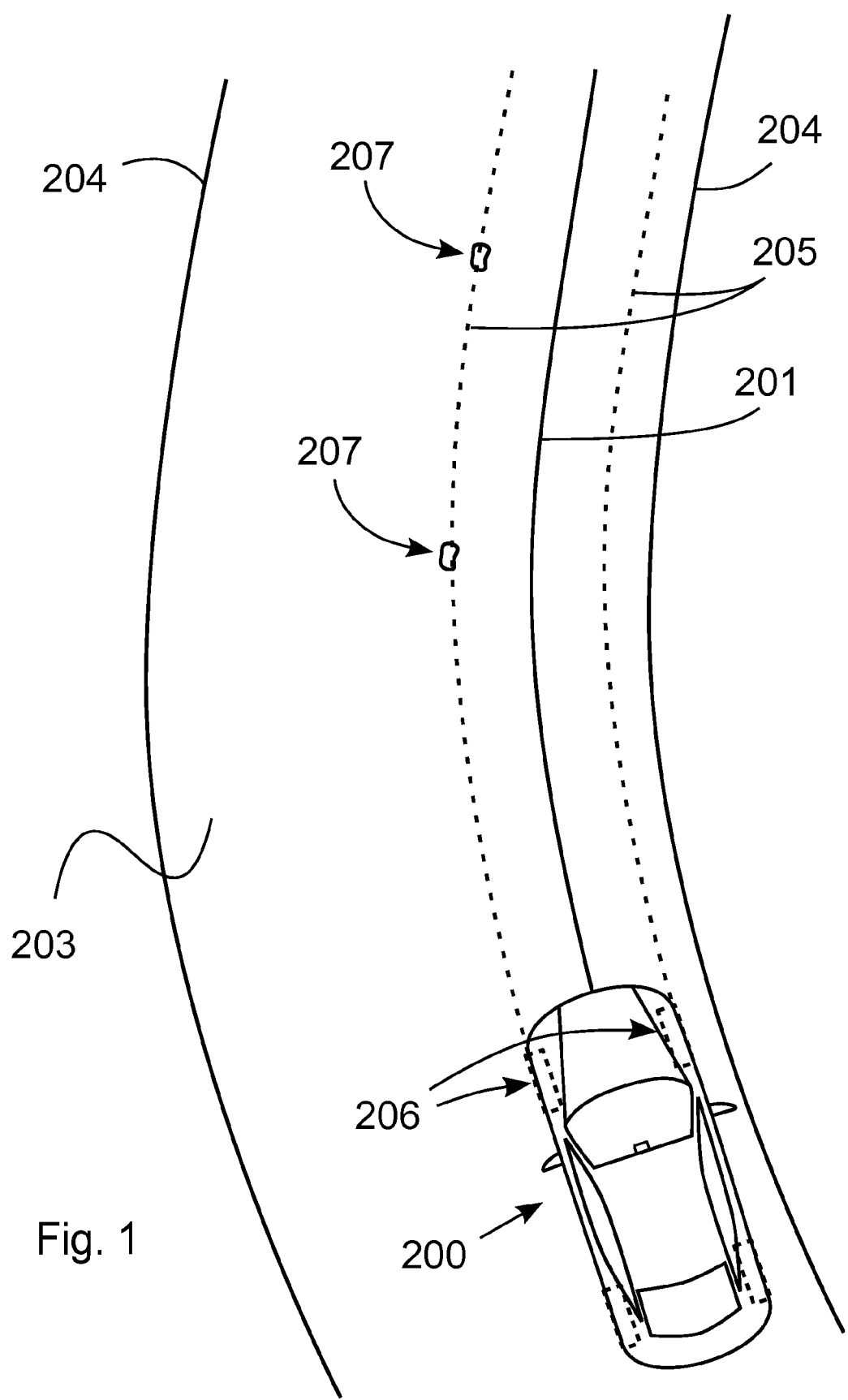
FIG. 1 illustrates a vehicle in a road environment.

FIG. 1 illustrates a vehicle 200 without any vehicle system for autonomous road irregularity avoidance.

The vehicle 200 drives autonomously or semi-autonomously along a determined vehicle trajectory 201 on a road 203. The road 203 runs in a longitudinal direction of the vehicle 200, and the road 203 is provided with road markings 204 at its sides. Trajectories 205 for vehicle wheels 206 are indicated with dashed lines on the road 203. The trajectories 205 for the wheels 206 are parallel to the determined vehicle trajectory 201 but displaced in a lateral direction, i.e. perpendicular to the determined vehicle trajectory 201.

The road 203 comprises road irregularities 207 in form of bumps, obstacles and/or potholes. If no care is taken to avoid the road irregularities 207 ahead of the vehicle 200, the wheel trajectories 205 may intersect the road irregularities 207 as illustrated in FIG. 1. When one or more of the vehicle wheels 206 are driven into one or several of the road irregularities 207, a driver of the vehicle 200 may experience discomfort.

Figure 2:
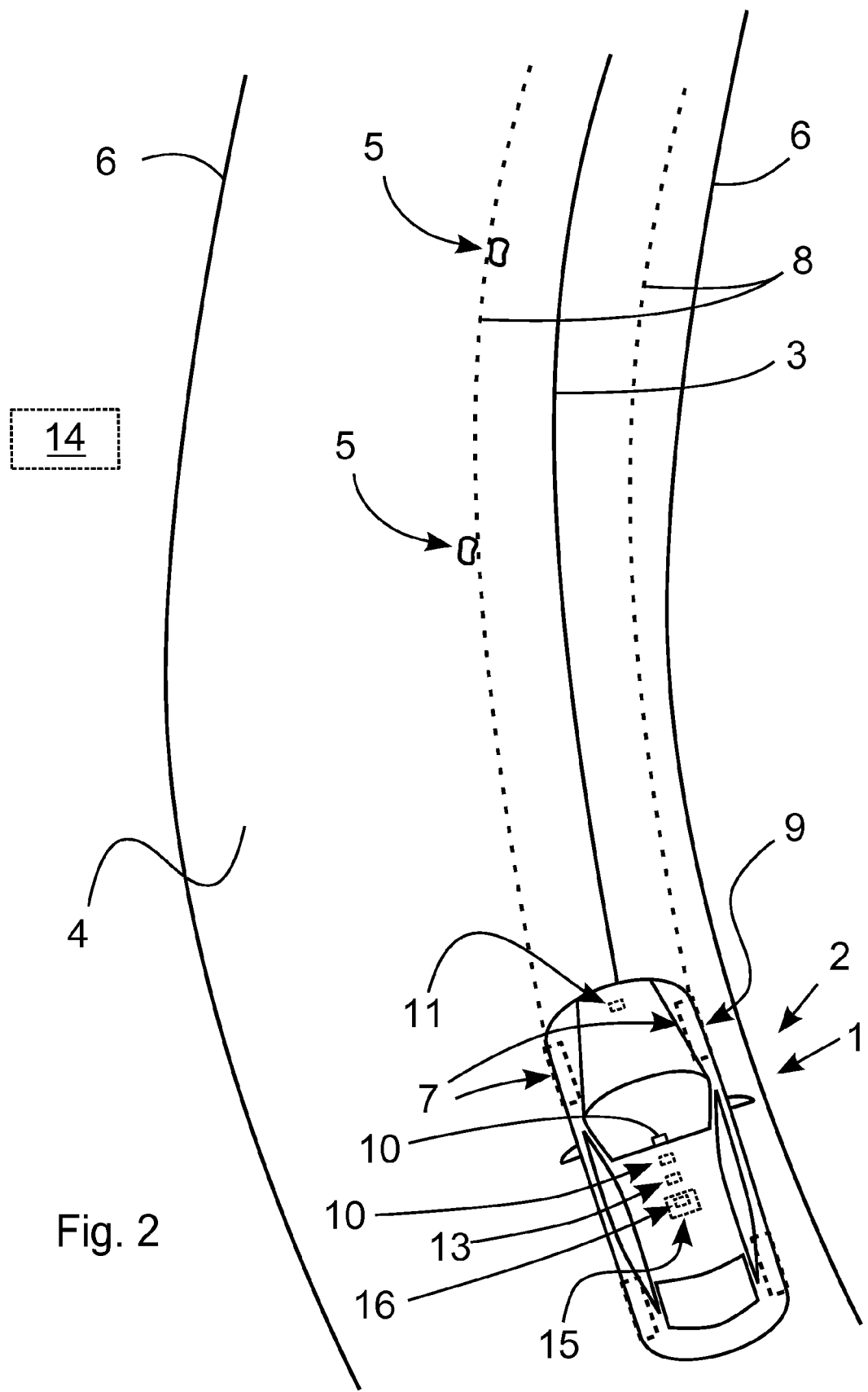
FIG. 2 illustrates a vehicle and a vehicle system for autonomous road irregularity avoidance according to some embodiments.

In FIG. 2, a host vehicle 1 and a vehicle system 2 for autonomous road irregularity avoidance according to some embodiments are illustrated.

The host vehicle 1 is driven along vehicle trajectory 3 on a road 4 comprising road irregularities 5. According to the FIG. 2 illustrated embodiment, the road 4 is provided with road markings 6 on its sides, but the host vehicle 1 may be driven also along roads without any road markings.

The host vehicle 1 comprises vehicle wheels 7, which are in contact with a surface of the road 4. Trajectories 8 for the wheels 7 are illustrated in parallel with the vehicle trajectory 3. The trajectories 8 for the vehicle wheels 7 are indicated with dashed lines. The trajectories 8 for the wheels 7 runs in parallel with the vehicle trajectory 3 and are displaced in a lateral direction, i.e. perpendicular to the determined vehicle trajectory 3. A host vehicle steering system 9 is arranged to affect at least one host vehicle wheel 7, for enabling steering of the host vehicle 1.

The vehicle system 2 comprises vehicle sensors 10, arranged to detect any irregularities 5 on the road 4. The sensors 10 may be direct sensors, arranged to detect road irregularities 5 when one or more of the wheels 7 is in contact with one or more of the road irregularities 5. Different kind of sensors 10 may be used, such as; Inertial sensors arranged to detect acceleration in different directions. Wheel sensors which can detect forces acting on a wheel. Tire pressure sensors arranged to detect a tire pressure and/or changes of tire pressure. An active chassis sensor which can detect chassis movement A vehicle level sensor, capable to detect when at least a part of the chassis is raised or lowered. An acoustic sensor, arranged to detect a sound related to the contact between a wheel 7 and a road irregularity 5.

One or more of the sensors 10 may be indirect sensors, arranged to detect road irregularities ahead of the host vehicle. The sensors 10 can include an image capturing sensor, such as a front facing camera. The image capturing sensor may be a camera arranged to detect objects in visible light, IR-light or UV-light. The sensors 10 may include a radar sensor and/or a lidar sensor arranged to detect road irregularities 5 on the road 4 ahead of the host vehicle 1.

The vehicle system 2 further comprises one or more position determination means 11, arranged to continuously determine the host vehicle 1 position. Two or more position determination means 11 may cooperate for the determination of the host vehicle 1 position. The position determination means 11 may comprise a combined satellite based positioning and mapping system, such as the American Global Positioning System (GPS), the European Galileo global navigation satellite system (GNSS), the Russian Globalnaya Navigatsionnaya Sputnikovaya Sistema or Global Navigation Satellite System (GLONASS) or the Chinese BeiDou (Compass) Navigation Satellite System.

According to some embodiments, the position determination means 11 comprises a vehicle system for detecting a lateral distance from road markings 6 or from other detectable references along the road 4. An image capturing system comprising logic for object recognition may be used for detecting the distance between a host vehicle 1, or any part thereof, such as the wheels 7, and road markings 6.

The vehicle system illustrated in FIG. 2 comprises communication means 13, arranged to send vehicle sensor data relating to detected road irregularities 5 and host vehicle position information to an external database 14 for compiling road irregularity position information. The communication means 13 are also arrange to receive, from the external database 14, information relating to road irregularity positions on the road ahead of the host vehicle 1. The communication means 13 may comprise a transmitter which converts vehicle sensor data and host vehicle position information to a signal, such as an electrical signal and/or a signal carried by electromagnetic waves, and a receiver that receives signals and converts them to information, such as information relating to road irregularity positions. Any suitable means may be used for the communication between the host vehicle 1 and the external database 14, e.g. radio signals, such as according to either of the GSM, 3G, LTE and/or WiFi standards, and/or satellite communication signals.

Several different vehicles equipped with vehicle systems 2 for autonomous road irregularity avoidance may send vehicle sensor data to the external database 14 and receive information relating to road irregularity positions on a road ahead of the respective vehicle. Hereby information relating to road irregularities on a road network may be compiled. Information sent to the external database 14 from one vehicle may thus be available for other vehicles during autonomous road irregularity avoidance.

Since the communication means 13 are arranged to receive information relating to road irregularity positions on the road 4 ahead of the host vehicle 1 from the external database 14, the information is received to the vehicle system 2 based on the location and/or direction of the vehicle 1 hosting the vehicle system 2.

The vehicle system 2 in the host vehicle 1 is also arranged to evaluate whether all wheels 7 of the host vehicle 1 were laterally displaced from all detected road irregularities 5 for a predefined road section of a used trajectory. The result of the evaluation is sent to the external database 14 such that the database 14 continuously is updated. If no road irregularity 5 was detected, when a host vehicle was driven along a vehicle trajectory 3 for a predefined road section where a road irregularity 5 was earlier detected, the updated information is sent to the external database 14. Hereby the external database 14 is updated not only with information of detected road irregularities 5 but also with information of repaired road irregularities, where the road 4 is in good condition again. New trajectories, for which all wheels 7 of a host vehicle 1 can be laterally displaced from detected road irregularities 5 for a predefined road section, can thereby be determined.

As illustrated in FIG. 2, there is a distance between a trajectory 8 for a wheel 7 and the vehicle trajectory 3. This distance can be different for different vehicle models, and this is distance is taken into account during the determination of trajectories for the host vehicle for which all wheels 7 of the host vehicle 1 are laterally displaced from one or more road irregularities 5 ahead of the host vehicle 1.

The vehicle system 5 may be part of, or connected to, an Intelligent Transport System with road side units for determination of the position and/or for communication with the external database 14.

The vehicle system 2, as illustrated in FIG. 2, further comprises processing means 15. The processing means 15 comprises one or more processing units, with associated steering control logic, and one or more memory units 16 in communication with the one or more processing units. A processing unit may be a central processing unit, CPU, also referred to as a central processor unit. A CPU is hardware within a computer that carries out instructions of a computer program/software when this is executed by performing basic arithmetical, logical, and input/output operations. The processing means 15 may also comprise an accelerated processing unit, APU, also referred to as an advanced processing unit. An APU is a processing unit that includes additional processing capability designed to accelerate one or more types of computations outside of a CPU. The processing means 15 may also comprise an application programming interface, API, which specifies how software components may interact with each other.

The processing means 15, upon execution of the associated steering control logic on the one or more processing units, can determine a trajectory 3 for the host vehicle 1 for which all wheels 7 of the host vehicle 1 are laterally displaced from one or more road irregularities 5 ahead of the host vehicle 1. The processing means 15 are further arranged to control the vehicle steering system 9 to autonomously steer the host vehicle 1 along the determined trajectory 3.

The processing means 15 are arranged to determine the vehicle trajectory 3 ahead of the host vehicle 1 based on gathered data relating to road conditions and host vehicle position, direction and/or velocity. The processing means 15 are further arranged to determine whether all wheels 7 of the host vehicle 1 are laterally displaced from one or more road irregularities 5 ahead of the host vehicle 1 when the host vehicle 1 is driven along the trajectory 3. If the processing means 15 determine that one or more of the wheels 7 will intersect the one or more road irregularities 5, the determined trajectory 3 is adjusted laterally along at least a part of the vehicle trajectory 3 such that the vehicle wheels 7 may pass the one or more road irregularities 5 on a left hand side and/or on a right hand side, as seen in the longitudinal direction of the vehicle trajectory 3. Thus, the system 2 may only intervene when necessary, i.e. when it is determined that contact between one or more of the wheels 7 and one or more road irregularities 5 will occur. According to some embodiments, a vehicle trajectory 3 is only determined when the host vehicle 1 is within a predefined distance from upcoming road irregularities 5.

The system 2 may receive information of upcoming road irregularities 5 at any desired predefined distance ahead of the host vehicle 1. Therefore, if a vehicle trajectory 3 is determined well before a road irregularity 5, the processing means 15 may control the vehicle steering system 9 to autonomously steer the host vehicle 1 just a small amount, such as one or a few degrees, to the right or to the left of upcoming road irregularities 5. Thanks to this, the vehicle trajectory 3 can be very smooth, such that only a small lateral acceleration will act on the host vehicle 1 due to the intervention of the system 2. The autonomous road irregularity avoidance may be particularly useful in situations where a driver normally may encounter difficulties to see potholes ahead, e.g. when driving at night or in tunnels.

The processing means 15 are arranged to evaluate whether all wheels 7 of the host vehicle 1 were laterally displaced from all detected road irregularities 5 for a predefined road section of a used vehicle trajectory 3. This may be done continuously or when the host vehicle 1 is in within a predefined distance from road irregularities 5. The result of the evaluation may be sent to the external database 14 such that the database is continuously updated of road irregularities 5. According to some embodiments, the result of the evaluation is sent only when one or more road irregularities 5 are detected. If no road irregularities 5 were detected during the evaluation, the used vehicle trajectory 3 is considered free from road irregularities.

Figure 3:
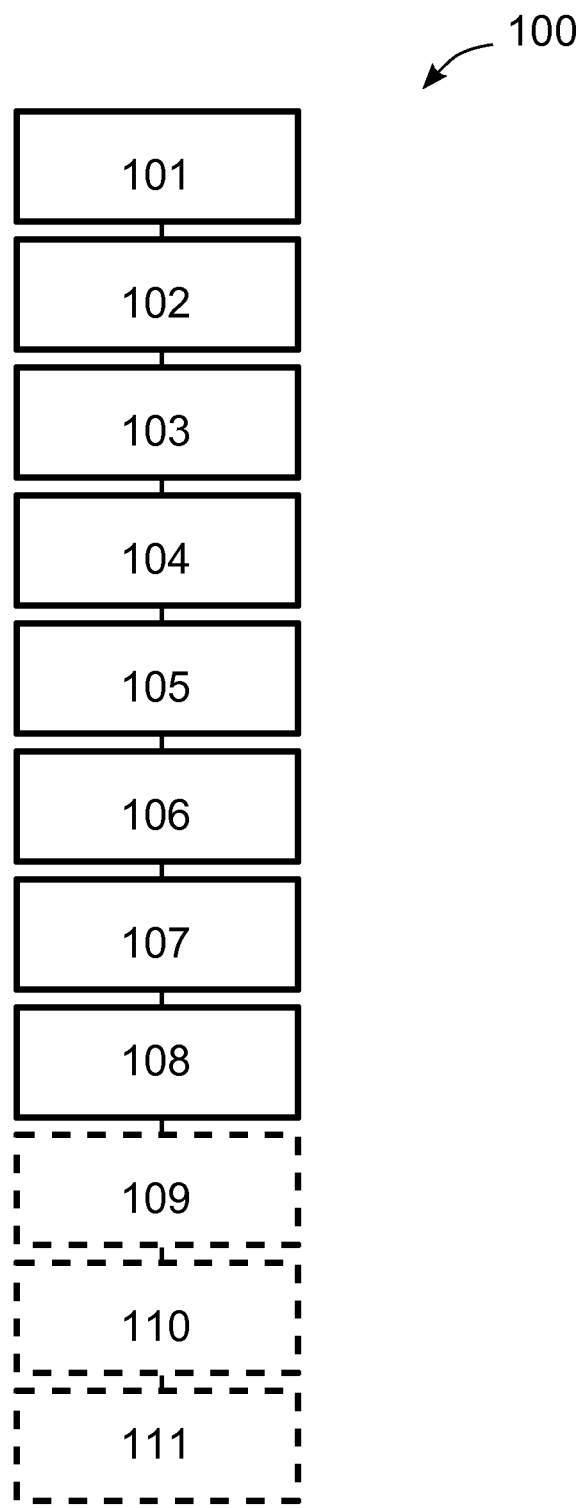
FIG. 3 illustrates a method for allowing a host vehicle to autonomously avoid road irregularities.

In FIG. 3 is illustrated a method 100 for allowing a host vehicle to autonomously avoid road irregularities on a road travelled by the host vehicle. The method 100 comprises;

Detecting 101, by vehicle sensors, irregularities on a road travelled by the host vehicle.

Continuously determining 102 the host vehicle position, using position determination means. Sending 103, by communication means, vehicle sensor data relating to detected road irregularities and host vehicle position information to an external database for compiling road irregularity position information. Receiving 104, from the external database, information relating to road irregularity positions on the road ahead of the host vehicle. Determining 105, by processing means, a trajectory for the host vehicle for which all wheels of the host vehicle are laterally displaced from one or more road irregularities ahead of the host vehicle. Autonomously steering 106 the host vehicle along the determined trajectory. Evaluating 107, by the processing means, whether all wheels of the host vehicle were laterally displaced from all detected road irregularities for a predefined road section of a used trajectory. Sending 108, by the communication means, a result of the evaluation to the external database.

According to some embodiments, the method 100 further comprises; Determining 109, by the processing means, the host vehicle trajectory for which a, by the vehicle sensors detected, lateral acceleration of the host vehicle is minimized.

According to some embodiments, the method 100 further comprises; Detecting 110, by the vehicle sensors, at least one of an elevation and an extension of a road irregularity when at least one of the host vehicle wheels is in contact with the road irregularity. Sending 111, by the communication means, vehicle sensor data relating to at least one of an elevation and an extension of the road irregularity to the external database. With the term elevation of a road irregularity is here to be understood its height above or below the fixed reference of the road surface.

Although the aspects has been described with reference to example embodiments, many different alterations, modifications and the like will become apparent for those skilled in the art. For example, if no trajectory for which all wheels 7 of the host vehicle 1 are laterally displaced from one or more road irregularities 5 ahead of the host vehicle 1 may be determined, a trajectory 3 that intersect with the lowest amount of road irregularities may be determined instead.

The system 2 and method for autonomous road irregularity avoidance described herein is applicable both to fully automated vehicles, i.e. vehicles capable of autonomous driving without any continuous input from a vehicle operator/driver, and to vehicles having a combined manual and autonomous input during essentially manual driving, so called semi-autonomous driving. In the latter case the system 2 and method for autonomous road irregularity avoidance described herein may be arranged to semi-autonomously provide a steering torque to the steering system, even when a driver has his/her hands placed on the steering wheel. In this case the contribution may provide a supportive input but still be subordinated to the control of the driver.

Therefore, it is to be understood that the foregoing is illustrative of various example embodiments and the scope of the appended claims is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle system for autonomous road irregularity avoidance comprising:
    vehicle sensors arranged to detect irregularities on a road travelled by a host vehicle;
    position determination means arranged to continuously determine the host vehicle position;
    communication means arranged to send vehicle sensor data relating to detected road irregularities and host vehicle position information to an external database for compiling road irregularity position information;
    processing means comprising steering control logic;
    a vehicle steering system arranged to affect at least one host vehicle wheel, for enabling steering of the host vehicle;
    wherein the communication means are arranged to receive, from the external database, information relating to road irregularity positions on the road ahead of the host vehicle, the processing means are arranged to determine a trajectory for the host vehicle for which all wheels of the host vehicle are laterally displaced from one or more road irregularities ahead of the host vehicle, the vehicle steering system is further arranged to autonomously steer the host vehicle along the determined trajectory, the processing means are further arranged to evaluate whether all wheels of the host vehicle were laterally displaced from all detected road irregularities for a predefined road section of a used trajectory, and the communication means are further arranged to send the result of the evaluation to the external database.

2. The vehicle system of claim 1 wherein the position determination means are arranged to determine the host vehicle position using input both from a global positioning system and from a vehicle system for detecting a lateral distance from road markings.

3. The vehicle system of claim 1 wherein the vehicle system comprises lateral acceleration sensors, arranged to detect lateral acceleration of the host vehicle, and the processing means are arranged to determine the host vehicle trajectory for which a lateral acceleration of the host vehicle is minimized.

4. The vehicle system of claim 1 wherein one or more of the vehicle sensors are arranged to detect a road irregularity when at least one of the host vehicle wheels is in contact with the road irregularity, the sensor being at least one of an inertia sensor, an active chassis sensor, a wheel sensor, an acoustic sensor and a vehicle level sensor.

5. The vehicle system of claim 1 wherein one or more of the vehicle sensors are arranged to detect a road irregularity ahead of the host vehicle, the sensor being at least one of an image capturing sensor, a radar sensor and a lidar sensor.

6. The vehicle system of claim 4 wherein one or more of the sensors are arranged to detect at least one of an elevation and an extension of a road irregularity when at least one of the host vehicle wheels is in contact with the road irregularity, the communication means further being arranged to send vehicle sensor data relating to at least one of the elevation and the extension of the road irregularity to the external database.

7. The vehicle system of claim 5 wherein one or more of the sensors are arranged to detect at least one of an elevation and an extension of a road irregularity ahead of the host vehicle, the communication means further being arranged to send vehicle sensor data relating to at least one of the elevation and the extension of the road irregularity to the external database.

8. The vehicle system of claim 1 wherein the position determination means comprises a satellite based positioning and mapping system and/or an image capturing system comprising logic for object recognition.

9. A vehicle comprising a vehicle system for autonomous road irregularity avoidance according to claim 1.

10. A method for allowing a host vehicle to autonomously avoid road irregularities on a road travelled by the host vehicle, the method comprising:
    detecting, by vehicle sensors, irregularities on a road travelled by the host vehicle;
    continuously determining the host vehicle position, using position determination means;
    sending, by communication means, vehicle sensor data relating to detected road irregularities and host vehicle position information to an external database for compiling road irregularity position information;
    receiving, from the external database, information relating to road irregularity positions on the road ahead of the host vehicle;
    determining, by processing means, a trajectory for the host vehicle for which all wheels of the host vehicle are laterally displaced from one or more road irregularities ahead of the host vehicle;
    autonomously steering the host vehicle along the determined trajectory;
    evaluating, by the processing means, whether all wheels of the host vehicle were laterally displaced from all detected road irregularities for a predefined road section of a used trajectory; and
    sending, by the communication means, a result of the evaluation to the external database.

11. The method of claim 10 further comprising:
    determining, by the processing means, the host vehicle trajectory for which a lateral acceleration of the host vehicle is minimized.

12. The method of claim 10 further comprising:
    detecting, by the vehicle sensors, at least one of an elevation and an extension of a road irregularity when at least one of the host vehicle wheels is in contact with the road irregularity;
    sending, by the communication means, vehicle sensor data relating to at least one of an elevation and an extension of the road irregularity to the external database.

13. A vehicle system for autonomous road irregularity avoidance comprising:
    a vehicle sensor for use in detecting irregularities on a road travelled by a host vehicle;
    a position determination unit for determining the host vehicle position;
    a transceiver for sending vehicle sensor data relating to detected road irregularities and host vehicle position information to an external database for compiling road irregularity position information;
    a processing unit comprising a memory unit and steering control logic;
    a vehicle steering system for enabling steering of the host vehicle;
    wherein the transceiver is for receiving from the external database information relating to road irregularity positions on the road ahead of the host vehicle, the processing unit is for determining a trajectory for the host vehicle for which all wheels of the host vehicle are laterally displaced from one or more road irregularities ahead of the host vehicle, the vehicle steering system is for autonomously steering the host vehicle along the determined trajectory, the processing unit is for evaluating whether all wheels of the host vehicle were laterally displaced from all detected road irregularities for a predefined road section of a used trajectory, and the transceiver is for sending the result of the evaluation to the external database.

14. The vehicle system of claim 13 wherein the position determination unit is for determining the host vehicle position using input both from a global positioning system and from a vehicle system for detecting a lateral distance from road markings.

15. The vehicle system of claim 13 wherein the vehicle system comprises lateral acceleration sensors arranged to detect lateral acceleration of the host vehicle, and the processor is for determining the host vehicle trajectory for which a lateral acceleration of the host vehicle is minimized.

16. The vehicle system of claim 13 wherein one or more of the vehicle sensors are for use in detecting a road irregularity when at least one of the host vehicle wheels is in contact with the road irregularity, the one or more sensors being at least one of an inertia sensor, an active chassis sensor, a wheel sensor, an acoustic sensor and a vehicle level sensor.

17. The vehicle system of claim 13 wherein one or more of the vehicle sensors are for use in detecting a road irregularity ahead of the host vehicle, the one or more sensors being at least one of an image capturing sensor, a radar sensor and a lidar sensor.

18. The vehicle system of claim 16 wherein one or more of the sensors are for use in detecting at least one of an elevation and an extension of a road irregularity when at least one of the host vehicle wheels is in contact with the road irregularity, and the transceiver is for sending vehicle sensor data relating to at least one of the elevation and the extension of the road irregularity to the external database.

19. The vehicle system of claim 18 wherein one or more of the sensors are for use in detecting at least one of an elevation and an extension of a road irregularity ahead of the host vehicle, and the transceiver is for sending vehicle sensor data relating to at least one of the elevation and the extension of the road irregularity to the external database.

20. A vehicle comprising a vehicle system for autonomous road irregularity avoidance according to claim 13.

* * * * *